INVENTORS
HAROLD B. ROBINSON
DAVID J. VALLEY
ATTORNEY

INVENTORS.
HAROLD B. ROBINSON
DAVID J. VALLEY
BY
ATTORNEY

United States Patent Office …

3,264,536
Patented August 2, 1966

3,264,536
CAPACITOR WITH A POLYARYLENE POLYETHER
DIELECTRIC
Harold B. Robinson, Chatham, N.J., and David J. Valley, Cleveland, Ohio, assignors to Union Carbide Corporation, a corporation of New York
Filed July 20, 1964, Ser. No. 383,624
5 Claims. (Cl. 317—258)

This invention relates to novel electrical capacitors having improved high temperature, capacitance, and dissipation characteristics. More particularly, this invention relates to novel electrical capacitors comprising at least two electrically conductive metal layers separated by a dielectric layer of solid thermoplastic polyarylene polyether.

Thermoplastic materials exhibiting dielectric characteristics have been employed as the dielectric material in capacitor constructions. The use of thermoplastic materials in this application is attributable to the generally good physical properties of these materials and the ease with which they can be formed into thin films for use in capacitors. However, several problems have become associated with the use of thermoplastic materials in capacitor constructions. One such problem is the notoriously poor thermal and dimensional stability of thermoplastic materials at elevated temperatures. The maximum operating temperature of a capacitor is seriously limited by the ability of its thermoplastic dielectric to withstand elevated temperatures. When this ability is exceeded the dielectric properties of the thermoplastic deteriorate rapidly thereby rendering the capacitor useless.

Another serious problem that has existed centers around the tendency of thermoplastic materials to vary widely in capacitance and dissipation characteristics over a wide range of temperature and frequency. Obviously, this is undesirable where a capacitor is exposed to a wide range of temperature and frequency in normal use. One widely used thermoplastic material in capacitor construction is polyethylene terephthalate film, more commonly known as Mylar. This material, as is more fully described below, is limited by a maximum operating temperature in capacitor constructions of only about 135° C. Furthermore, this material exhibits extremely wide variations in capacitance and dissipation characteristics over a wide range of temperature and frequency.

These and other problems have been solved by the present invention. The novel capacitor of the present invention which is adapted to retain and store an electrical charge comprises at least two electrically conductive metal layers separated and electrically isolated from each other by a void free dielectric layer of solid thermoplastic polyarylene polyether.

Because the discovered dielectric is a thermoplastic material, films of polyarylene polyether can be readily prepared by conventional techniques. Furthermore, capacitors of this invention can be fabricated with ease using conventional techniques. The capacitors of the present invention are capable of operating at temperatures higher than prior capacitors having a thermoplastic dielectric and, more importantly, exhibit substantially invariable capacitance and dissipation characteristics over a wide range of temperature and frequency. As such, the capacitors of the present invention unexpectedly possess capabilities and exhibit unpredictable properties heretofore unavailable in capacitor constructions incorporating a thermoplastic dielectric material. The capacitors then have greatly improved performance characteristics and are available for a wider variety of applications than prior capacitors of similar constructions.

In the drawings:
FIGURE 1 is a graph comparing percent capacitance change over a temperature range of $-50$ to $175°$ C. for a capacitor of the present invention having a layer of thermoplastic polyarylene polyether as the dielectric, and capacitors having layers of polyethylene terephthalate and bisphenol A polycarbonate as the dielectric.

Figure 1:
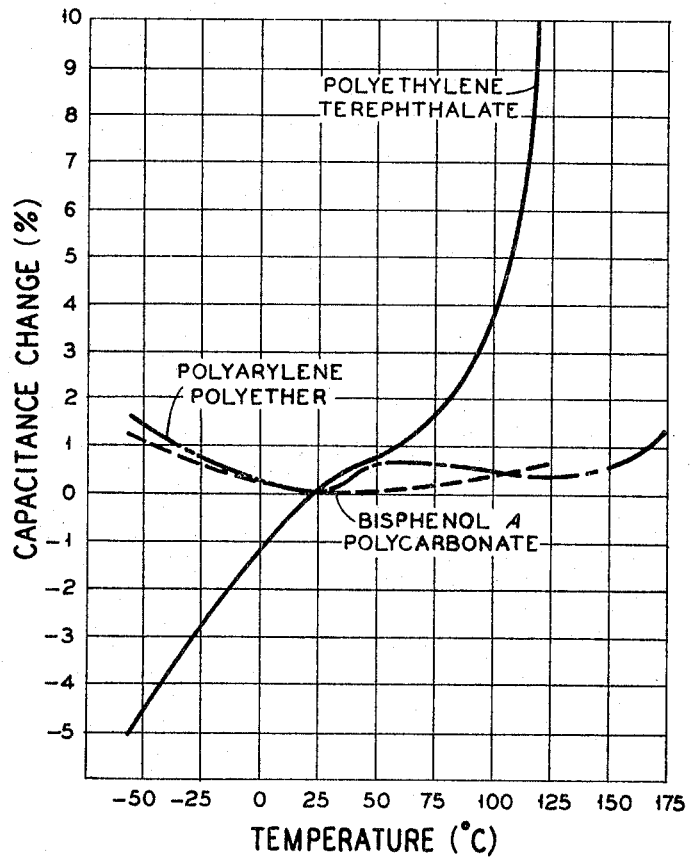

Thermoplastic polyarylene polyethers utilized in the capacitors of the present invention are the linear thermoplastic reaction products of an alkali metal double salt of a dihydric phenol and a dihalobenzenoid compound. The polymer has a basic structure composed of recurring units having the formula

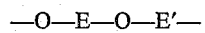
—O—E—O—E'— wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl)propane, 1,1-bis-(4-hydroxyphenyl)-2-phenyl ethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, ether oxygen (—O—), carbonyl (—CO—), sulfide (—S—), sulfone (—SO$_2$—) or hydrocarbon residue in which the two phenolic nuclei are joined to the same or different carbon atoms of the residue such as, for example, the bisphenol of acetophenone, the bis-phenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

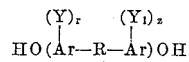

wherein Ar is an aromatic group and preferably is a phenylene group, Y and $Y_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, $r$ and $z$ are integers having a value of from 0 to 4, inclusive, and R is representative of a bond between aromatic carbon atoms as in dihydroxydiphenyl, or is a divalent radical, including for example, inorganic radicals as —CO—, —O—, —S—, —S—S—, —SO$_2$—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis(4-hydroxyphenyl)propane,
2,4'-dihydroxydiphenyl-methane,
bis-(2-hydroxyphenyl)methane,
bis-(4-hydroxyphenyl)-methane,
bis-(4-hydroxy-2,6-dimethyl-3-methoxyphenyl) methane,
1,1-bis-(4-hydroxyphenyl)ethane,
1,2-bis-(4-hydroxyphenyl)-ethane,
1,1-bis-(4-hydroxy-2-chlorophenyl)ethane,
1,1-bis-(3-methyl-4-hydroxyphenyl)propane,
1,3-bis(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxy-naphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxy-phenyl)-1-phenylpropane,
2,2-bis-(4-hydroxyphenyl)-1,1,1,3,3,3-hexafluoropropane and the like;

Di(hydroxyphenyl)sulfones such as bis-(4-hydroxyphenyl)sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

Di(hydroxyphenyl)ethers such as bis-(4-hydroxyphenyl)-ether, the 4,3'-, 4,2'-, 2,2'- 2,3'-dihydroxydiphenyl ethers, 4,4'-dihydroxy-2,6-dimethyldiphenyl ether, bis-(4-hydroxy - 3 - isobutylphenyl)ether, bis-(4-hydroxy-3-isopropylphenyl)ether, bis-(4-hydroxy-3-chlorophenyl)ether, bis-(4-hydroxy-3-fluorophenyl)ether, bis-(4-hydroxy - 3-bromophenyl)ether, bis-(4-hydroxy-naphthyl)ether, bis-(4-hydroxy-3-chloronaphthyl)ether, 4,4'-dihydroxy-3,6-dimethoxydiphenyl ether, 4,4'-dihydroxy-2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxy groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para position of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group (—SO$_2$—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Bunnett in Chem. Rev., 49, 273 (1951) and Quart. Rev., 12, 1 (1958).

The electron withdrawing group of the dihalobenzenoid compound can function either through the resonance of the aromatic ring, as indicated by those groups having a high sigma* value, i.e. above about +0.7 or by induction as in perfluoro compounds and like electron sinks.

Preferably the activating group should have a high sigma* value, preferably above 1.0, although sufficient activity is evidenced in those groups having a sigma* value above 0.7.

The activating group can be basically either of two types:
(a) monovalent groups that activate one or more halogens on the same ring as a nitro group, phenylsulfone, or alkylsulfone, cyano, trifluoromethyl, nitroso, and hetero nitrogen as in pyridine.
(b) divalent groups which can activate displacement of halogens on two different rings, such as the sulfone group —SO$_2$—; the carbonyl group —CO—; the vinyl group —CH=CH—; the sulfoxide group —SO—; the azo group —N=N—; the saturated fluorocarbon groups

—CF$_2$CF$_2$— organic phosphine oxides

where R is a hydrocarbon group, and the ethylidene group

where X can be hydrogen or halogen or divalent groups which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

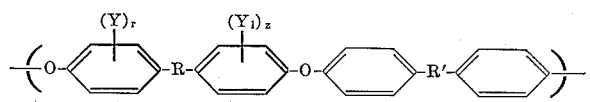

wherein R represents a member of the groups consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y$_1$ each represent inert substituent groups selected from the group consisting of halogen, alkyl groups having from 1 to 4 carbon atoms and alkoxy groups having from 1 to 4 carbon atoms and where r and z are integers having a value from 0 to 4 inclusive. Even more preferred are the thermoplastic polyarylene polyethers of the above formula wherein r and z are zero, R is divalent connecting radical

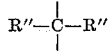

wherein R" represents a member of the group consisting of hydrogen, lower alkyl, lower aryl, and the halogen substituted groups thereof, and R' is a sulfone group.

Thermoplastic polyarylene polyethers described herein can be prepared in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

The specific solvents employed have the formula

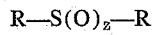

wherein each R represents a monovalent lower hydrocarbon group free of aliphatic unsaturation on the alpha carbon atom, and preferably contains less than about 8 carbon atoms or when connected together represents a divalent alkylene group with z being an integer from 1 to 2 inclusive. In all of these solvents, all oxygens and two carbon atoms are bonded directly to the sulfur atom. Specifically mentionable of these solvents are dimethylsulfoxide, dimethylsulfone, diethylsulfoxide, diethylsulfone, diisopropylsulfone, tetrahydrothiophene 1,1-dioxide (commonly called tetramethylene sulfone or sulfolane), tetrahydrothiophene-1 monoxide, and the like.

Thermoplastic polyarylene polyethers described herein can also be prepared in a two-step process in which dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

In the polymerization reactions described herein substantially anhydrous conditions are maintained before and during the reaction. While amounts of water up to about one percent can be tolerated amounts of water substantially greater than this are desirably avoided. In order to secure high molecular weight polymers, the system should be substantially anhydrous, and preferably with less than 0.5 percent by weight water in the reaction mixtures.

In the two-step process described above, where the alkali metal salt of the dihydric phenol is prepared in situ in the reaction solvent, the dihydric phenol and an alkali metal hydroxide are admixed in essentially stoichiometric amounts and normal precautions taken to remove all the water of neutralization preferably by distillation of a water-containing azeotrope from the solvent-metal salt mixture. Benzene, xylene, halogenated benzenes or other inert organic azeotrope-forming organic liquids are suitable for this purpose.

The azeotrope former can be one either miscible or immiscible with the sulfone or sulfoxide major solvent. If it is not miscible it should be one which will not cause precipitation of the polymer in the reaction mass. Heptane is such a solvent. It is preferred to employ azeotrope formers which are miscible with the major solvents and which also act as cosolvents for polymer during polymerization. Chlorobenzene, dichlorobenzene and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former. It has been found that chlorobenzene and o-dichlorobenzene serve particularly well as the inert diluent and are able to significantly reduce the amount of the sulfone or sulfoxide solvent necessary. The cosolvent mixture using even as much as 50 percent of the halogenated benzene with dimethylsulfoxide, for example, not only permits the former polymer to remain in solution and thus produce high molecular weight polymers, but also provides a very economical processing system, and an effective dehydration operation.

The reaction between the dihalobenzenoid compound and the alkali metal salt of the bisphenol proceeds on an equimolar basis. This can be slightly varied but as little a variation of 5 percent away from equal molar amounts seriously reduces the molecular weight of the polymers.

The reaction of the dihalobenzenoid compound with the alkali metal salt of the dihydric phenol readily proceeds without need of an added catalyst upon the application of heat to such a mixture in the selected sulfone or sulfoxide solvent.

Also desirable is the exclusion of oxygen from the reaction mass to avoid any possibility of oxidative attack to the polymer or to the principal solvent during polymerization.

Reactive temperatures above room temperature and generally above 100° C., are preferred. More preferred are temperatures between about 120° C. to 160° C. Higher temperatures can of course be employed, if desired, provided that care is taken to prevent degradation or decomposition of the reactants, the polymer and the solvents employed. Also temperatures higher than 100° C. are preferred in order to keep the polymer in solution during the reaction since these sulfoxide and sulfone solvents are not particularly good solvents for the polymer except in the hot condition.

The polymer is recovered from the reaction mass in any convenient manner, such as by precipitation induced by cooling the reaction mass or by adding a nonsolvent for the polymer, or the solid polymer can be recovered by stripping off the solvent at reduced pressures or elevated temperatures.

Since the polymerization reaction results in the formation of the alkali metal halide on each coupling reaction, it is preferred to either filter the salts from the polymer solution or to wash the polymer to substantially free it from these salts.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

The capacitors of the present invention can be fabricated by any suitable technique from any metal conductor and thermoplastic polyarylene polyether described herein. The capacitors so fabricated can be of the stacked or planar variety or may be of the rolled type depending on the ultimate end use designated for the capacitor. The size of the capacitor and the thickness of the metal conductor layers and the thermoplastic polyarylene polyether layer are likewise governed by the end use intended for the capacitor. In the planar type of capacitor, thicknesses ranging from about 0.01 mil to about 1 mil are generally employed for the metal conductor layers while thicknesses ranging from about 0.004 mil to about 10 mils are generally employed for the dielectric layer of thermoplastic polyarylene polyether. In rolled type capacitors, the metal conductor layer generally ranges in thickness from about 0.17 mil to about 0.5 mil while the dielectric layer of thermoplastic polyarylene polyether generally ranges in thickness from about 0.1 mil to about 1 mil.

As stated above, the capacitor of this invention broadly comprises at least two electrically conductive metal layers separated by a dielectric layer of solid thermoplastic polyarylene polyether. The layer of polyarylene polyether can be in the form of a separate free film or it can be integrally bonded to at least one of the conductive metal layers. The term "free film" is intended to refer to capacitor constructions where the dielectric layer is not secured to the conductive metal layers by means of mechanical adhesion but rather is held in place by mechanical forces resulting from the constructed form of the capacitor, e.g. rolled or stacked. In fabricating the bonded type of capacitor constructions, it is essential that this integral bonding be complete over the entire surface of the metal conductor layer or layers and that the dielectric layer of thermoplastic polyarylene polyether be void free to avoid arcing and subsequent failure of the capacitor. Any technique which accomplishes this end may be employed. For instance, thermoplastic polyarylene polyether can be cast from solution onto a metal conductor. Alternately, the dielectric polyarylene polyether can be extruded in the form of a thin film directly onto a metal conductor or a preformed film can be bonded to a metal conductor through the application of heat and pressure. Pretreating the metal conductor and/or thermoplastic polyarylene polyether to promote the adhesion of one to the other can be employed if desired.

In fabricating the capacitors, it is within the purview of this invention to deposit a layer of thermoplastic polyarylene polyether onto a thin foil or wire of conductive metal and subsequently build up alternating layers of metal and polymer until the desired thickness of the capacitor is obtained or the degree of capacitance desired is secured. It is also within the purview of this invention to vacuum evaporate and vapor deposit a metal film on a polyarylene polyether coated foil or wire and to attach leads to the metal substrate and to the vapor deposited metal film. In this manner, it is possible to build up as many alternating coatings as desired, providing during the deposition, leads are made to alternate vapor deposited metal layers by masking or other suitable techniques.

The capacitors can also be fabricated by depositing a thin metal film by vapor technique onto a film of thermoplastic polyarylene polyether. Alternating layers of thermoplastic polyarylene polyether film and metal film can be built up in this manner until the desired thickness for the capacitor is obtained or the degree of capacitance desired is secured. These composites of metal and thermoplastic polyarylene polyether film can be employed as planar capacitors or can be wound up and used as rolled capacitors.

When employing the vapor technique, the vapor deposited conductive metal film should be of sufficient thickness so that there is complete conduction of electrical charges throughout the entire surface of metal film and thus avoid the deposition of islands of metal not interconnected with each other. This can be achieved readily at thicknesses of 1000 angstrom units and when care is employed in assuring a clean substrate and using certain pure metals for deposition, vapor deposited metal films as thin as 100 angstrom units can be secured. Certain metals such as chromium, aluminum and lead tend to deposit as very thin, completely conducting films whereas others tend to agglomerate on deposition to give islands of metal and thus require a somewhat thicker coat. Zinc, silver, gold and cadmium tend to be in this class and will form islands of metal which must be interconnected before electrical conduction takes place. Hence, thicker films may be required for certain of these metals.

Best results have been found in those vapor deposited metal films having a thickness of 500 to 5000 angstrom units. Thicker films can be used but in multilayer capacitors some have a tendency to pull apart at the metal layer or to strip off the substrate since the vapor deposited metal layer has little mechanical strength. However, for many end uses, this is not critical and may not be disadvantageous.

A distinct and unique advantage of this metal vapor deposition technique is the self-heating power of capacitors made thereby. Any short circuit through the dielectric can be removed by a current surge to burn through the thin vapor deposited metal film and thus remove it from the area of dielectric failure. Hence continued arcing or shorting of such capacitors is avoided or at least reduced to a rarity.

While the vapor deposition of metal to form the conducting metal layer of the capacitors of the present invention is preferred for most applications and for integrated circuits, it is also possible to employ metal foil as one or more of the conducting metal layers. For example, a preferred type of capacitor, either in planar or rolled type is that consisting of a metal foil coated on at least one side with thermoplastic polyarylene polyether and that in turn is coated with a conducting layer of vapor deposited metal, with leads attached to both of the metal films. This capacitor structure possesses the distinct advantage of having the conductive surfaces and the dielectric firmly bonded at each other without air entrapment in the dielectric or a chance for liquid or vapor to penetrate between the dielectric and conducting films and thus change or cause variation in capacitance.

It is not critical in this invention what particular metal is employed other than it should be normally solid and naturally conductive to the passage of electric charges. While any conductive metal can be used, it is generally preferred that the metal be an excellent natural conductor in the solid state, i.e. has a bulk resistivity less than $100\mu$ ohm centimeters and more preferably less than $10\mu$ ohm centimeters, such as for example gold, silver, copper, aluminum, and lead since there is low ohmic loss due to resistance of the metal in the charging and discharging of the capacitor. It is desirable that the metal be one easily evaporated and readily depositable by vacuum deposition techniques. Those metals readily deposited by vacuum evaporation normally have a deposition constant of at least $5 \times 10^{-6}$ grams per cm.$^2$ per second at 1 micron pressure (absolute) such as for example silver, gold, aluminum, lead, chromium, nickel, copper, tin, iron and platinum and thus are most effectively employed as conductive films in these elements.

Thus as employed herein, the term "conductive metal layer" is meant to encompass any metal layer sufficiently conductive to permit electrical charges to be substantially equally distributed over substantially all areas of the layer. Thus any self-supporting foil or metal sheet, or a vapor-deposited metal film is contemplated.

The unique results obtained with the capacitors of this invention are due to the dielectric thermoplastic polyarylene polyether. These polymers provide a capacitor having capacitance and dissipation characteristics which are independent of temperature and frequency. These polymers remain tough and flexible over a wide range of temperature, especially at elevated temperatures, thus providing a capacitor with an operating temperature range not possessed by prior capacitors.

The capacitors of the present invention can have wire leads connected to the conductive metal layers by the direct application of solder, by spray soldering or by the use of conductive glues, paints or resins. If desired, the finished capacitor can itself be encapsulated with a final coating of thermoplastic polyarylene polyether. Of course, wax, epoxy resins and other materials including metal containers can also be used to encapsulate, impregnate and/or mechanically protect the thus formed capacitor.

Many applications are contemplated for the capacitors of this invention. Planar and roll capacitors can be used in miniaturized and microminiaturized electric circuitry such as in amplification, attenuation and rectification circuits and the like. The capacitors can also be employed in integrated circuit boards used in high speed switching elements and in memory recording devices.

For purposes of illustrating the discovered dielectric properties of thermoplastic polyarylene polyethers, Table I below lists comparative properties for thermoplastic polyarylene polyether composed of recurring units having the formula

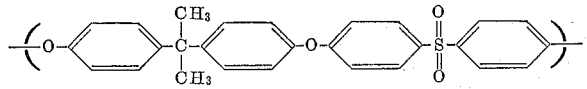

and other conventional dielectric polymer materials.

TABLE I

| Dielectric Material | Maximum Operating Temperature, °C. | Minimum Useful Thickness, Microns | Dielectric Constant (at 25° C. and 1k.c.) | Dielectric Strength, Volts/Mil (1 mil film) |
| --- | --- | --- | --- | --- |
| Polyarylene Polyether | 175 | 1 | 3.0 | 5,800 |
| Polyethylene Terephthalate | 135 | 4 | 3.2 | 4,000 |
| Polystyrene | 85 | 10 | 2.5 | |
| Irradiated Polyethylene | 85 | 40 | 2.25 | |
| Bisphenol A Polycarbonate | 125 | 6 | 3.0 | 3,100 |

As can be seen from Table I, polyarylene polyether utilized in the capacitors of this invention exhibit superior dielectric properties and are capable of being used in very thin films thereby permitting the fabrication of very small capacitors. Capacitance and dissipation characteristics are discussed in Example 2 below.

The dielectric property data reported herein was obtained from tests conducted according to the procedures set forth in Mil Standard 202B, "Test Methods for Electronic and Electrical Components Parts," March 14, 1960.

Reduced viscosity (RV) reported herein was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation:

$$\text{Reduced Viscosity} = \frac{t_s - t_o}{c \cdot t_o}$$

wherein:

$t_o$ is the efflux time of the pure solvent
$t_s$ is the efflux time of the polymer solution
$c$ is the concentration of the polymer solution The following examples are illustrative of the present invention and are not intended to limit the same in any manner. All parts and percentages are by weight unless indicated otherwise.

*Example 1.—Prepartion of thermoplastic polyarylene polyether*

In a 250 ml. flask equipped with a stirrer, thermometer, a water cooled condenser and a Dean Stark moisture trap filled with benzene, there were placed 11.42 grams of 2,2-bis-(4-hydroxyphenyl)propane (0.05 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the raction mixture was an azeotrope with benzene and distilling off enough of the latter to give a refluxing mixture at 130–135° C., consisting of the dipotassium salt of the 2,2-bis-(4-hydroxyphenyl)propane and dimethylsulfoxide essentially free of water. The mixture was cooled and 14.35 grams (0.05 mole) of 4,4′-dichlorodiphenylsulfone was added followed by 40 ml. of anhydrous dimethylsulfoxide, all under nitrogen pressure. The mixture was heated to 130° C. and held at 130–140° C. with good stirring for 4–5 hours. The viscous, orange solution was poured into 300 ml. water, rapidly circulating in a Waring Blendor, and the finely divided white polymer was filtered and then dried in a vacuum oven at 110° C. for 16 hours. The yield was 22.2 g. (100%) and the reaction was 99% complete based on a titration for residual base.

The polymer had the basic structure

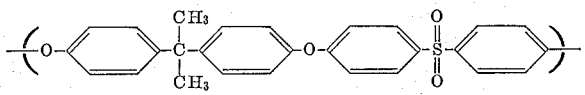

*Example 2.—Capacitor fabrication*

Polyarylene polyether prepared as in Example 1 and having a reduced viscosity of 0.50 was dissolved in chloroform. The polymer is also soluble in other solvents such as monochlorobenzene, methylene chloride, dioxane, cyclohexanone and the like. The polymer was then cast from the solution onto aluminum foil 0.25 mil thick, one inch wide. The coated foil was then cut into strips four feet long. The polymer coating was 5μ thick and was void free. Two strips of the coated foil were then wound into a roll with an offset of 0.1 inch to permit the coated foils to extend separately one to each end of the roll. The capacitors were rolled on a manually powered mandrel wrapping device. Sixty such rolls were prepared having a diameter of 0.300 inch. Wire leads were attached to each foil extending from the end of the roll. The rolls with leads attached were then inserted into a metal sleeve slightly larger in diameter than the rolls. Glass to metal end seals were applied to the ends of the metal sleeve. In this example, the polyarylene polyether is integrally bonded to only one of the adjacent conductive metal layers.

The capacitors prepared had an average nominal capacitance of 0.1079 μf. The average temperature coefficient of capacitance, expressed in p.p.m./° C., for the capacitors was 195 at −55° C., 60 at 85° C., 35 at 150° C. and 100 at 170° C. In addition, average capacitance for the capacitors was measured over the range of −50 to 175° C. Measurements were taken at −50, −30, 0, 50, 80, 125, 150, and 175° C. The percent change in capacitance was then calculated using capacitance at room temperature (23° C.) as the norm. These values were than plotted against temperature as is shown in FIGURE 1. Roll capacitors having the same capacitance ratings prepared from aluminum foil of the same dimensions and 5μ films of polyethylene terephthalate and bisphenol A polycarbonate were used to obtain comparative data. Values for percent change in capacitance were obtained as above and plotted against temperature as is shown in FIGURE 1. In FIGURE 1, the capacitance of capacitors of this invention is shown to be substantially invariable as compared to widely used polyethylene terephthalate capacitors. The latter exhibit a 15% change in capacitance over the range −50 to 120° C. This behavior is totally undesirable for applications where the capacitor is exposed to a wide range of temperature and frequency. While bisphenol A polycarbonate capacitors exhibit capacitance characteristics at lower temperatures similar to the present capacitors, it is significant that these capacitors are limited by an operating temperature of 125° C. whereas the present capacitors exhibit excellent dielectric properties at temperatures as high as 175° C.

Figure 2:
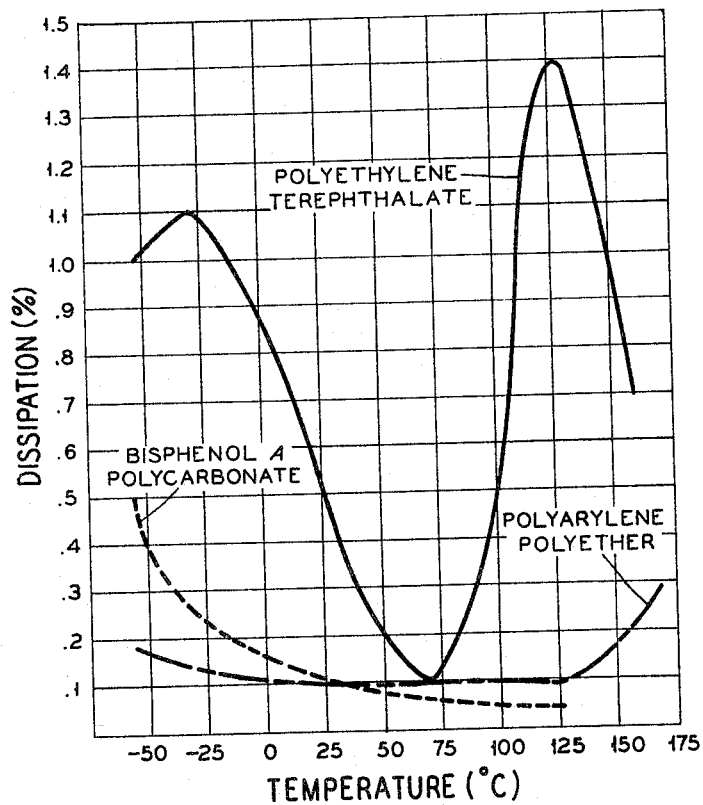
FIGURE 2 is a graph comparing percent dissipation over a temperature range of $-50$ to $175°$ C. for a capacitor of the present invention having a layer of thermoplastic polyarylene polyether as the dielectric and capacitors having layers of polyethylene terephthalate and bisphenol A polycarbonate as the dielectric.
Figure 3:
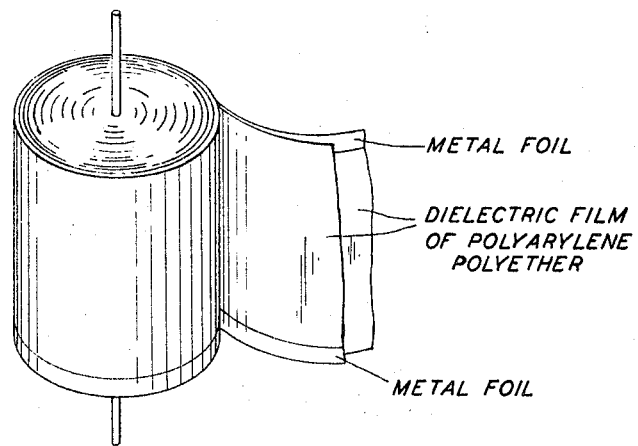
FIGURE 3 is a perspective view of a capacitor of the present invention wherein a rolled film capacitor is shown to include two adjacent metal foil layers each having a dielectric film of polyarylene polyether bonded thereto and each wound around a common axis.

The average dissipation at room temperature of the capacitors prepared above was found to be 0.098%. Percent dissipation was also measured over the range −50 to 175° C. Values obtained were then plotted against temperature as is shown in FIGURE 2. Similar values were obtained and plotted as is shown in FIGURE 2 for the polyethylene terephthalate and bisphenol A polycarbonate capacitors described above. In FIGURE 2, it is significant that the capacitors of this invention show very little change in percent dissipation over a wide range of temperature as compared to polyethylene terephthalate and bisphenol A polycarbonate capacitors.

*Example 3*

Thermoplastic polyarylene polyether having the formula

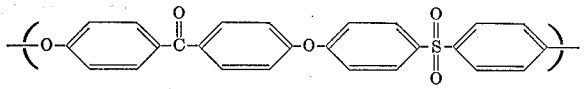

is prepared from the bisphenol of benzophenone and 4,4'-dichlorodiphenylsulfone according to the procedure in Example 1. This polymer is then used to form a roll capacitor as in Example 2. Maximum operating temperature and capacitance and dissipation characteristics are similar to the capacitors of Example 2.

*Example 4*

Thermoplastic polyarylene polyether having the formula

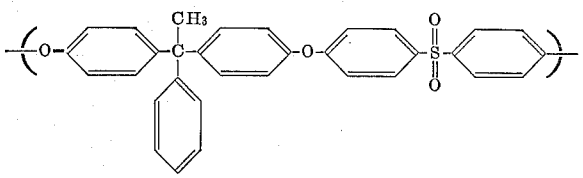

is prepared from the bisphenol of acetophenone and 4,4'-dichlorodiphenylsulfone according to the procedure in Example 1. This polymer is then used to form a roll capacitor as in Example 2. Maximum operating temperature and capacitance and dissipation characteristics are similar to the capacitors of Example 2.

*Example 5*

Thermoplastic polyarylene polyether having the formula

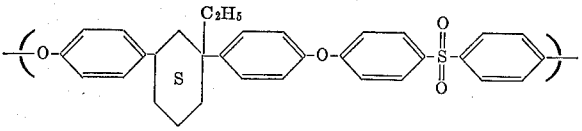

is prepared from the bisphenol of vinyl cyclohexene (prepared by a nacid catalyzed condensation of 2 moles of phenol with one mole of vinyl cyclohexene) and 4,4'-dichlorodiphenylsulfone according to the procedure in Example 1. This polymer is then used to form a roll capacitor as in Example 2. Maximum operating temperature and capacitance and dissipation characteristics are similar to the capacitors of Example 2.

*Example 6*

Thermoplastic polyarylene polyether having the formula

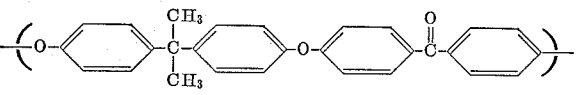

is prepared from 2,2'-bis-(4-hydroxyphenyl)propane and 4,4'-difluorobenzophenone according to the procedure in Example 1. This polymer is then used to form a roll capacitor as in Example 2. Maximum operating temperature and capacitance and dissipation characteristics are similar to the capacitors of Example 2.

*Example 7*

Thermoplastic polyarylene polyether having the formula

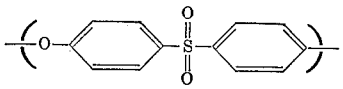

is prepared from 4,4'-dihydroxydiphenyl sulfone and 4,4'-dichlorodiphenyl sulfone according to the procedure in Example 1. This polymer is then used to form a roll capacitor as in Example 2. Maximum operating temperature and capacitance and dissipation characteristics are similar to the capacitors of Example 2.

*Example 8*

Polyarylene polyether film prepared as in Example 1 and having a thickness of 0.5 mil is placed between two strips of aluminum foil 1 inch wide, four feet long and 0.25 mil thick. The foils are offset 0.1 inch as in Example 2. Capacitors are then rolled, leads attached thereto and encapsulated in the manner described in Example 2. The dielectric layer of polyarylene polyether in this example is in the form of a free film in that it is not adhesively bonded to either metal foil but is secured in place by the wrapping and encapsulating operations. Maximum operating temperatures and capacitance and dissipation characteristics are similar to the capacitors of Example 2.

Stacked capacitors wherein the dielectric layer of polyarylene polyether is in the form of a free film can also be prepared in the same manner as the rolled capacitors described in Example 8.

*Example 9*

The coated metal foil strips described in Example 2 are provided with a vapor deposited coating of conductive metal on the polyarylene polyether layer. Aluminum is vaporized in tungsten filament baskets in a quartz tube placed in the bell jar of a Kinney vacuum evaporator and condensed on the coated metal foil positioned in the quartz tube. Capacitors are then rolled, separate leads attached to the metal foil and the vapor deposited metal layer, and encapsulated in the manner described in Example 2. In this example, the polyarylene polyether is integrally bonded to both conductive metal layers. Maximum operating temperature and capacitance and dissipation characteristics are similar to the capacitors of Example 2.

Roll capacitors wherein both conductive metal layers are vapor deposited can be prepared in the same manner as the capacitors of Example 9. Also, stacked capacitors wherein one metal layer is a foil and the other is vapor deposited or wherein both metal layers are vapor deposited can be prepared in the same manner as the capacitors of Example 9.

We claim:

1. In a capacitor adapted to retain and store an electrical charge comprising at least two electrically conductive metal layers separated and electrically isolated from each other by a void free dielectric layer; the improvement wherein said dielectric layer is a solid, linear thermoplastic polyarylene polyether composed of recurring units having the formula:

$$-(O-E-O-E')-$$

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms.

2. The capacitor defined in claim 1 wherein said polyarylene polyether is composed of recurring units having the formula

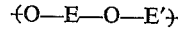
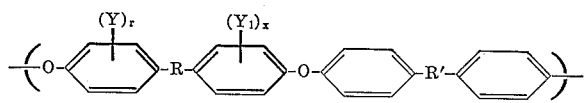

wherein R is a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive.

3. The capacitor defined in claim 1 wherein said polyarylene polyether is composed of recurring units having the formula

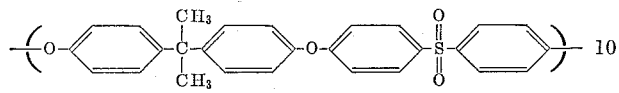

4. The capacitor defined in claim 1 wherein said capacitor is a stacked capacitor.

5. The capacitor defined in claim 1 wherein said capacitor is a rolled capacitor.

References Cited by the Examiner
UNITED STATES PATENTS

| | | | |
|---|---|---|---|
| 873,751 | 12/1907 | Hopkins | 317—261 |
| 965,992 | 8/1910 | Dean | 317—260 |
| 971,667 | 10/1910 | Dean | 317—260 |
| 2,938,153 | 4/1960 | Netherwood | 317—258 |
| 2,995,688 | 8/1961 | Rosenberg | 317—258 |
| 3,133,899 | 4/1964 | Kwiatek et al. | |

FOREIGN PATENTS 1,073,630  1/1960  Germany.

LARAMIE E. ASKIN, *Primary Examiner.*

JOHN F. BURNS, *Examiner.*

E. GOLDBERG, *Assistant Examiner.*

Dedication 3,264,536.—*Harold B. Robinson*, Chatham, N.J., and *David J. Valley*, Cleveland, Ohio. CAPACITOR WITH A POLYARYLENE POLYETHER DIELECTRIC. Patent dated Aug. 2, 1966. Dedication filed Jan. 25, 1972, by the assignee, *Union Carbide Corporation*.

Hereby dedicates to the Public the remaining term of said patent.

[*Official Gazette March 7, 1972.*]